UNITED STATES PATENT OFFICE.

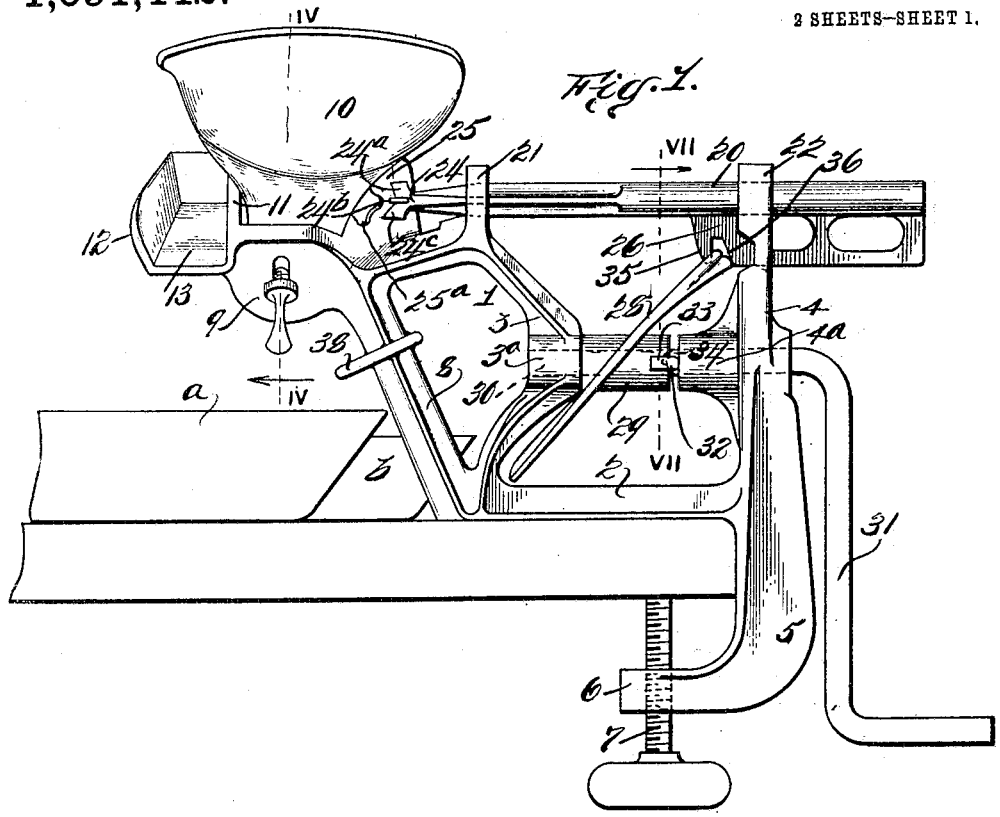

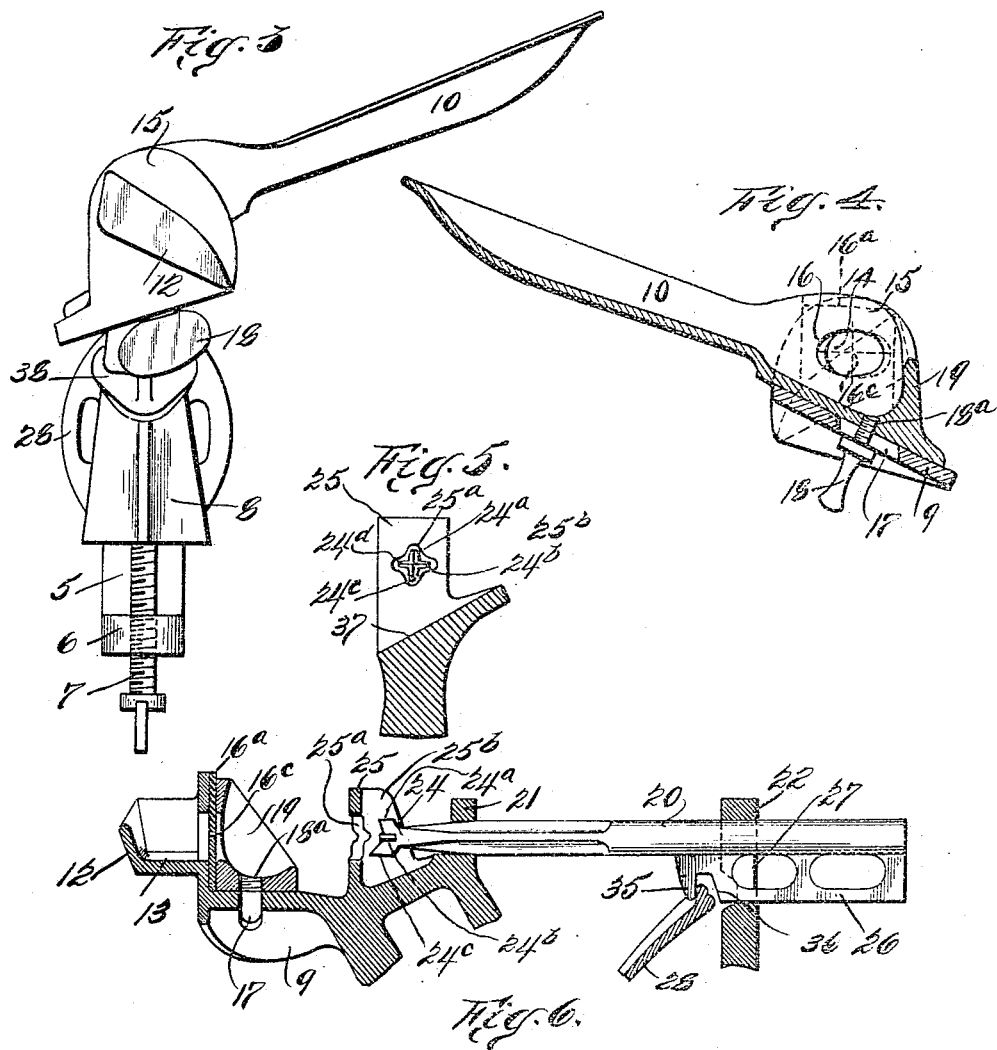

MICHAEL A. ROLLMAN, OF MOUNT JOY, PENNSYLVANIA, ASSIGNOR TO NEW STANDARD HARDWARE WORKS, OF MOUNT JOY, PENNSYLVANIA, A CORPORATION OF PENNSYLVANIA.

CHERRY-STONER.

1,091,442.  Specification of Letters Patent.  Patented Mar. 24, 1914.

Application filed April 26, 1911.  Serial No. 623,349.

*To all whom it may concern:*

Be it known that I, MICHAEL A. ROLLMAN, a citizen of the United States, residing at Mount Joy, county of Lancaster, State of Pennsylvania, have invented certain new and useful Improvements in Cherry-Stoners, of which the following is a clear, full, and exact description.

This invention relates to improvements in machines for pitting or stoning fruit, such as cherries, and the main object of the invention is to provide suitable means for removing the pits or stones from the fruit and for directing the pulpy mass or meats of the fruit in one direction, and the pits or stones in another direction, the parts being so organized as to provide a simple, convenient and practical means for removing and separating stones from fruit.

One of the principal objects of the invention is to provide means for converting a rotary motion into a reciprocatory motion in such way that by the simple turning of a hand-crank the head for ejecting the pits or stones from the fruit has a suitable range of motion and moves with the necessary speed.

Further objects will appear hereinafter.

These being among the objects of the present invention, the same consists of certain features of construction and combinations of parts to be hereinafter described and then pointed out in the claims with reference to the accompanying drawings illustrating a desirable form of the invention, and in which—

Figure 1 is a front elevation of the improved cherry-stoner showing how the same is supported for use; Fig. 2 is a plan view of the machine, also shown as supported, the hopper of the machine being indicated by broken lines; Fig. 3 is a view of the machine looking toward the stone-discharging end; Fig. 4 is a vertical transverse section on the line IV—IV, Fig. 1; Fig. 5 is a detail transverse section on the line V—V, Fig. 2; Fig. 6 is a longitudinal section of the machine on the line VI—VI, Fig. 2; Fig. 7 is a detail transverse section on the line VII—VII, Fig. 1; and Fig. 8 is a detail view, showing a modified stripper.

Referring to the drawings, the frame 1 of the machine may be of any suitable construction, but for the purpose of the embodiment of the invention shown in the drawings, it is preferably constructed as most plainly illustrated in Fig. 1. The frame shown comprises a base 2 and two uprights or standards 3, 4, together with a bracket 5 which is provided with a lateral extension or lug 6 located under the base portion 2. Said lug 6 supports means for clamping the machine in position, which clamping means preferably consists of a thumb-screw 7, so that when the base 2 of the frame is placed upon a table the screw 7 may be turned so as to bind upon the underside of the table, as clearly shown in Fig. 1. Said frame 1 comprises in addition a preferably inclined upright or standard 8, between which and the standard 4 the standard 3 is located, and at the upper end of the standard 8 there is a rest piece 9 for the support of a fruit hopper 10. The hopper may be of any suitable construction and is secured in a manner presently to be described. At that side of the hopper away from the main portion of the machine, the said frame 1 is provided with an upright plate 11 supporting a stone or pit-discharge chute 12 having a bottom 13 inclined in opposite direction to the inclination of the hopper 10 so that the hopper will feed the cherries or other fruit in one direction transversely of the machine, while the chute 12 will discharge the pits or stones in the opposite direction. The hopper and the discharge chute are substantially parallel with each other.

The vertical extension or wing 11 at one side of the chute 13 is provided with an orifice 14 through which the pits or stones are projected into the chute, and the hopper 10 is provided with an adjacent upwardly-extending plate or wing 15 which is provided with an opening or aperture 16 adapted to register with the opening 14. A suitable leather or rubber hold-back disk or member 16ª is secured in a recess 16ᵇ between the hopper and the wing 11, and the same is provided with a preferably cross shaped slit 16ᶜ. The main body of the fruit is pressed against the slitted member 16ª to restrain it while the pit or stone is being pushed through the slit 16ᶜ by the stone extractor. The edge of the hopper surrounding its aperture 16 constitutes an abutment for the fruit to hold it while the stone or pit is being extracted. For the purpose of enabling the removal of the hopper for any purpose desired, and for permitting the hopper to be adjusted with its opening 16 relative to the opening 14, the rest portion 9 of the frame 1 is provided with a slot 17 extending transversely of the frame, through which passes a thumb-screw 18 which is adapted to screw into a threaded opening 18$^a$ in the bottom of said hopper. By this adjusting means the hopper may not only be removed and replaced in position, but it may be adjusted in a longitudinal direction transversely of the frame. The downwardly-inclined hopper 10 has at its lower end beyond the opening or aperture 16 a lateral inwardly-extending flange or deflector 19.

The frame 1 supports a reciprocating plunger 20 by means of guides 21, 22, which extend upwardly from the frame, and is provided at its inner end with an ejector head 24, which comprises four radial teeth or points 24$^a$, 24$^b$, 24$^c$, and 24$^d$, the same being adapted to extract the pit or stone as will hereinafter appear. The line of reciprocation of the plunger and its ejector head 24 is coincident with the apertures 16 and 14 located between the ejector head and the pit-discharge chute 12, and said ejector head is adapted to be projected through a pulp-stripper 25 shown more clearly in Figs. 5 and 6. Said pulp-stripper 25 is located on the frame 1 at that side of the delivery end of the fruit-hopper opposite its aperture 16, and is provided with an opening 25$^a$ through which the ejector head is moved. The stripper 25 consists of a plate extending transversely and obliquely of the frame 1, so that it will have an inclination way from the delivery end of the fruit-hopper. That is to say, the angularity of the stripper-plate 25 is such that it is nearer the hopper at one end than at the other and lies in a plane substantially that of the hopper itself. The inner edge 25$^b$ of the stripper constitutes a finger guard to prevent the fingers of the operator while feeding the fruit to the ejecting point, from being injured by the ejector head. The lower tooth 24$^c$ of the ejector head is preferably longer than the others to act to tilt the fruit back upon the other teeth and center the stone with the ejector.

The plunger 20 is provided with a laterally and longitudinally-extending wing or fin 26 located at one end of the plunger, which wing is guided in a slot 27 in the standard 4, for the purpose of preventing the turning of the plunger, and for the further purpose of furnishing means for the engagement of a part such as a cam 28, which is adapted to reciprocate the plunger and ejector head. Said cam 28 consists of an elliptical plate having a hub 29 which is keyed to the rotary shaft 30 that is journaled in suitable bearings 3$^a$, 4$^a$ of the frame 1, and is provided with a hand-crank 31. The cam-fastening means preferably comprises a pin 32 which is driven through the shaft 30 and the ends 33 of which are bent laterally and over one end of hub 29 so as to engage in several suitable notches or recesses 34 in said hub. The edge of the cam is used as a driver to reciprocate the plunger 20, and to effectuate this end there are located at the inner end of the wing 26 on the plunger two spaced shoulders 35 and 36, between which shoulders the edge of said cam engages. It will be seen that the described driving means is adapted to convert the rotary motion of the drive shaft into a reciprocating one in the plunger, and that this conversion of motion is effectuated by so constructing and disposing the cam as that its driving portion will always have a traveling engagement with one portion of the plunger 20. The crank 31 extends in the direction of the longest diameter of the cam, and the plunger is of such a length that during its reciprocating motion it will not interfere with the rotation of the crank. It will be seen, furthermore, that one edge of the cam serves to move the plunger and ejector head forwardly, while the other edge of the cam serves to move them rearwardly.

Between the stripper 25 and the delivery end of the hopper, the frame 1 is provided with an inclined pulp delivery member or chute 37, shown more clearly in Fig. 5. the inclination of the chute being opposite to the inclination of the chute 12 so that the pulp will be directed to one side of the machine, and the stones or pits to the other side.

While the mechanism is so constructed as to express the least juice possible from the fruit, yet some juice is expressed, and to prevent the same from running down upon the table, the machine is preferably provided with an inclined guard 38, in the form of a flange surrounding the standard 8.

Reference letter $a$ indicates a dish or pan which is to be located under the stone or pit-discharge chute 13 to catch the stones or pits, while reference letter $b$ indicates another plate or dish which is to be located under the guard 38 so as to catch the pulp or meat and the juice which flows off of the said guard.

The operation of the machine is as follows: The fruit, such as cherries, is placed in the hopper 10 and one cherry at a time centered opposite the aperture 16 in the hopper, the fingers being protected by abutting against the stripper 25. The crank 31 is now turned so as to project the ejector-head 24 through the opening in the stripper 25, said ejector-head being pressed into the cherry held at the orificed portion of the hopper, and said ejector-head forcing the stone or pit from the cherry into the discharge chute 12, from whence the pit is discharged into the dish $a$ previously placed in position.

A continued rotation of the hand-crank withdraws the ejector-head which carries the meat or pulp of the cherry with it until the same is brought in contact with the inclined stripper 25, which acts to detach the pulp or meat which then falls down the incline 37 into the dish b, already provided. The same operation is repeated on the next cherry at the lower end of the supply hopper 10. It will be seen that by reason of the inclination of the cam plate 28 that the reciprocating motion of the plunger and its ejector head 24 is expedited. Any of the juice which happens to be extracted runs down the incline 37 and is intercepted by the inclined juice guard 38, from whence the juice flows into the dish b.

It is apparent that the machine shown and described is susceptible of various modifications which are within the scope of the invention, and such modifications may consist in omitting some parts, adding other parts, and in modifying any or all of the parts described. For instance, there might be used a stripper 39 in place of the inclined stripper 25.

What I claim as new is:

1. In a machine of the character described, the combination of a frame, orificed means thereon for centering fruit to be stoned, a horizontal plunger guided on said frame and having a stone-ejecting head, a pulp-stripper in the path of movement of said ejecting head, said orificed means and stripper being disposed in vertical planes, a rotary shaft journaled in said frame parallel with said plunger, an inclined cam-plate mounted on said shaft to reciprocate said plunger, and means located at one side of the plane of said cam-plate to rotate said shaft, said orificed means and pulp-stripper being located at the other side of said cam-plate.

2. In a machine of the character described, the combination of fruit centering means, stripping means, a reciprocatory stone-ejecting device movable into both of said means, rotary operating means for reciprocating said ejecting device, the axes of both of which extend in the same direction, and separate means for discharging the stones and the stoned fruit respectively in opposite directions relatively to the axis of said rotary means.

3. In a machine of the character described, the combination of a frame provided with an orifice, a hopper provided with a pocket to which said hopper feeds, said orifice being located in a substantially vertical plane to one side of the pocket end of said hopper, and means for adjusting said hopper on said frame relatively to said orifice.

4. In a machine of the character described, the combination of a frame provided with an orifice, a hopper provided with a pocket to which said hopper feeds, said orifice being located in a substantially vertical plane to one side of the pocket end of said hopper, and a pin-and-slot connection between said hopper and frame for adjusting said hopper, the slot of said connection extending lengthwise of said hopper.

5. In a machine of the character described, the combination of a frame, a hopper having a pocket at its discharge end and provided at one side of its pocket and laterally of and above its feeding surface with a fruit-holding orifice located in a substantially vertical plane.

6. In a machine of the character described, the combination of a frame provided with an orifice, a hopper provided with a pocket to which said hopper feeds, said orifice being located to one side of the pocket end of said hopper and said hopper having a fruit-holding orifice, at one side of its pocket end, and opposite said frame orifice, both of said orifices being located in substantially vertical planes, and means for longitudinally adjusting said hopper on said frame.

7. In a machine of the character described, the combination of a frame, orificed means for the abutment of fruit, a movable stone ejector guided by said frame, a rigid meat stripper through which said ejector passes, said stripper being disposed in a substantially vertical position and inclined horizontally with respect to said orificed means, so that it is turned toward the discharge side of said machine to assist in discharging the meats or pulps from the machine, and an inclined delivery member or chute to complete the delivery of the meats or pulps from the machine.

8. In a machine of the character described, the combination of a frame, orificed means for the abutment of fruit, a movable stone ejector guided by said frame, a hopper leading to said orificed means, and a meat stripper through which said ejector passes, said stripper being disposed in a substantially vertical position and inclined horizontally with respect to said orificed means, its inner end constituting a finger guard.

9. In a machine of the character described, a frame, means mounted thereon for stoning fruit, said frame having a juice intercepting and diverting guard under said stoning means, said guard substantially surrounding a part of said frame.

10. In a machine of the character described, a frame, having a side orifice, an orificed part laterally opposite aforesaid orifice, means for relatively adjusting the orificed parts, an inclined hopper having a fruit-supporting-pocket at its lower end, said orifices being located to one side of said pocket, and a plunger operating from the opposite side of said pocket for pushing fruit sidewise against said orificed part.

11. In a machine of the character described, the combination of a frame, a hopper supported by the frame, means for centering the fruit at one side of said hopper during ejection of the stone, which means is located above the feeding surface of said hopper, and an ejector head supported by said frame and movable in a horizontal plane into said centering means.

12. In a machine of the character described, the combination of a frame, a hopper supported thereby for holding fruit to be stoned, means for centering the fruit at one side of the lower end of the said hopper, an ejector head provided with suitable means for reciprocation toward said centering means, and an end discharge chute for receiving the stones or pits, said chute being directed in a direction opposite to that of the direction of feed of the hopper, and both chutes being directed away from the line of movement of said head.

13. In a machine of the character described, the combination of a frame, an inclined hopper provided with a pocket and having at one side of its pocket a fruit-holding orifice located above the feeding surface of said hopper, and a horizontally movable ejector head opposite said orifice.

14. A fruit stone ejector having a plurality of teeth, the lower of which is the longer.

15. In a machine of the character described, the combination of a frame, orificed means for the abutment of fruit, a movable stone-ejector guided by said frame, a rigid meat stripper through which said ejector passes, said stripper being disposed with its stripping face in a substantially vertical position and being nearer at its inner edge to said orificed means than at its outer edge, so that said stripper is turned horizontally toward the discharge side of said machine to assist in discharging the meats or pulps from the machine, and an inclined delivery member or chute to complete the delivery of the meats or pulps from the machine.

16. In a machine of the character described, the combination of a frame, orificed means for the abutment of fruit, a movable stone-ejector guided by said frame, a rigid meat stripper through which said ejector passes, said stripper being disposed with its stripping face in a substantially vertical position and being nearer at its inner edge to said orificed means than at its outer edge, so that said stripper is turned horizontally toward the discharge side of said machine to assist in discharging the meats or pulps from the machine, and means to complete the delivery of the meats or pulps from the machine.

MICHAEL A. ROLLMAN.

Witnesses:
M. N. BRUBAKER,
Jos. R. STRICKLER.

---

Copies of this patent may be obtained for five cents each, by addressing the "Commissioner of Patents, Washington, D. C."